United States Patent
Toshev et al.

(10) Patent No.: US 8,942,468 B1
(45) Date of Patent: Jan. 27, 2015

(54) OBJECT RECOGNITION

(75) Inventors: Alexander Toshkov Toshev, San Francisco, CA (US); King Hong Thomas Leung, Santa Clara, CA (US); Jiwoong Jack Sim, Philadelphia, PA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 13/448,735

(22) Filed: Apr. 17, 2012

(51) Int. Cl.
*G06K 9/62* (2006.01)

(52) U.S. Cl.
USPC ........... 382/159; 382/100; 382/195; 382/305; 382/224; 382/103

(58) Field of Classification Search
CPC ............. G06K 9/6256; G06K 9/00664; G06T 2201/0051; G06T 7/0081; G06F 17/30265
USPC .................. 382/159, 100, 195, 305, 224, 103
See application file for complete search history.

(56) References Cited

U.S. PATENT DOCUMENTS

| | | | |
|---|---|---|---|
| 6,028,960 A | 2/2000 | Graf et al. | |
| 7,149,368 B2 | 12/2006 | Tong et al. | |
| 7,436,986 B2 | 10/2008 | Caldwell | |
| 7,596,247 B2 | 9/2009 | Ioffe | |
| 7,680,330 B2 | 3/2010 | Leung | |
| 7,822,233 B2 | 10/2010 | Nagaoka et al. | |
| 7,844,085 B2 | 11/2010 | Lu et al. | |
| 7,848,544 B2 | 12/2010 | Mariani | |
| 8,085,995 B2 | 12/2011 | Yagnik | |
| 8,086,616 B1 | 12/2011 | Bissacco et al. | |
| 2003/0210808 A1 | 11/2003 | Chen et al. | |
| 2006/0251292 A1* | 11/2006 | Gokturk et al. | 382/103 |

OTHER PUBLICATIONS

Yali Amit et al., Joint Induction of Shape Features and Tree Classifiers, IEEE Transactions on Pattern Analysis and Machine Intelligence, Nov. 1997, pp. 1300-1305, vol. 19, No. 11.
Serge Belongie et al., Shape Matching and Object Recognition Using Shape Contexts, IEEE Transactions on Pattern Analysis and Machine Intelligence, Apr. 2002, pp. 509-522, vol. 24, No. 24.
Anna Bosch et al., Image Classification using Random Forests and Ferns, IEEE 11th International Conference on Computer Vision, Oct. 14-21, 2007, pp. 1-8.
Leo Breiman, Random Forests, Machine Learning, 2001, pp. 5-32, vol. 45, Kluwer Academic Publishers, Netherlands.
Chih-Chung Chang et al., LIBSV: A Library for Support Vector Machines, ACM Transactions on Intelligent Systems and Technology (TIST), Apr. 2011, 39 pages, vol. 2 Issue 3, ACM New York, NY.
V. Ferrari et al., Groups of Adjacent Contour Segments for Object Detection, IEEE Transactions on Pattern Analysis and Machine Intelligence, Jan. 2008, 2007, pp. 36-51, vol. 30 Issue 1, IEEE Computer Society Washington, DC.

(Continued)

*Primary Examiner* — Ruiping Li
(74) *Attorney, Agent, or Firm* — Fish & Richardson P.C.

(57) ABSTRACT

Techniques for a shape descriptor used for object recognition are described. Tokens of an object in digital image data are captured, where tokens can be edges, interest points or even parts. Geometric configurations of the tokens are captured by describing portions of the shape of the object. The shape of such configurations is finely quantized and each configuration from the image is assigned to a quantization bin. Objects are recognized by utilizing a number of quantization bins as features. This Abstract is submitted with the understanding that it will not be used to interpret or limit the scope or meaning of the claims.

26 Claims, 6 Drawing Sheets

(56) References Cited

OTHER PUBLICATIONS

David G. Lowe, Distinctive Image Features from Scale-Invariant Keypoints, International Journal of Computer Vision, 2004, pp. 91-110, vol. 60(2), Kluwer Academic Publishers, Netherlands.

Chengen Lu et al., Shape Guided Contour Grouping with Particle Filters, International Conference on Computer Vision, 2009, pp. 2288-2295.

Andreas Opelt et al., A Boundry-Fragment-Model for Object Detection, In Proceedings of the 9th European Conference on Computer Vision, 2006, pp. 575-588, vol. Part II, Springer-Verlag Berlin, Heidelberg.

Alexander Toshev et al., Shape-based Object Detection via Boundary Structure Segmentation, International Journal of Computer Vision, Mar. 22, 2012, pp. 1-24, Springer Science+Business Media, LLC 2012.

Mark Everingham et al., The 2005 PASCAL Visual Object Classes Challenge, In Machine Learning Challenges, 2006, pp. 117-176, Springer-Verlag Berlin 2006.

Alexander C. Berg et al., Shape Matching and Object Recognition using Low Distortion Correspondences, IEEE Computer Society Conference on Computer Vision and Pattern Recognition, 2005, pp. 26-33, vol. 1.

Stefan Carlsson, Order Structure, Correspondence and Shape Based Categories, In Proceedings of Shape, Contour and Grouping in Computer Vision, 1999, pp. 58-71, Springer-Verlag London, UK.

Alexander Toshev et al., Object Detection via Boundary Structure Segmentation, in proceeding of: The Twenty-Third IEEE Conference on Computer Vision and Pattern Recognition, CVPR 2010, Jun. 13-18, 2010, pp. 950-957.

Vittorio Ferrari et al., Object Detection by Contour Segment Networks, in Proceedings of the European Conference on Computer Vision, Jun. 2006, pp. 14-28, vol. Part III, Spinger-Verlag Berlin, Heidelberg.

Yehezkel Lamdan et al., Afline Invariant Model-Based Object Recognition, IEEE Transactions on Robotics and Automation (1990), pp. 578-589, Oct. 1990, vol. 6 No. 5.

David R. Martin et al., Learning to Detect Natural Image Boundaries Using Local Brightness, Color, and Texture Cues, IEEE Transactions on Pattern Analysis and Machine Intelligence, May 2004, pp. 530-549, vol. 26, No. 5.

Li Fei-Fei et al., Learning Generative Visual Models from Few Training Examples: An incremental Bayesian approach tested on 101 object categories, Proceedings of the Computer Vision and Image Understanding, Apr. 2007, pp. 59-70, vol. 106, Issue 1, Elsevier Science Inc., New York, NY.

Navneet Dalal et al., Histograms of Oriented Gradients for Human Detection, IEEE Computer Society Conference on Computer Vision and Pattern Recognition, CVPR 2005, Jun. 25, 2005, pp. 886-893, vol. 1.

Pedro F. Felzenszwalb et al., Hierarchical Matching of Deformable Shapes, IEEE Conference on ComputerVision and Pattern Recognition, CVPR '07, Jun. 17-22, 2007, pp. 1-8.

Oscar Danielsson et al., Generic Object Class Detection using Boosted Configurations of Oriented Edges, ACCV'10 Proceedings of the 10th Asian conference on Computer vision, 2011, pp. 1-14, vol. Part II, Springer-Verlag Berlin, Heidelberg.

Dengsheng Zhang et al., Evaluation of MPEG-7 Shape Descriptors against other Shape Descriptors, Multimedia Systems, Jul. 2003, pp. 15-30, vol. 9 Issue 1, Springer-Verlag New York, Inc., Secaucus, NJ.

Marius Leordeanu et al., Beyond Local Appearance: Category Recognition from Pairwise Interactions of Simple Features, In proceeding of 2007 IEEE Computer Society Conference on Computer Vision and Pattern Recognition (CVPR 2007), Jun. 17-22, 2007, pp. 1-8.

Jamie Shotton et al., Contour-Based Learning for Object Detection, Proceedings of the Tenth IEEE Conference on Computer Vision (ICCV'05), 2005, pp. 503-510, vol. 1, IEEE Computer Society, Washington, DC.

* cited by examiner

(a) $SVM_{n,m}$

Fig. 8

(b) $RDF_{n,d}$

OBJECT RECOGNITION

BACKGROUND

Object recognition is an increasingly important area of computer vision. Object recognition has a wide range of practical applications such as, for example, commerce, image searching, image archiving, image retrieval, image organization, manufacturing, security, and the like.

Many objects, such as apparel, are defined by shape. For example, boots and sandals are distinguished from each other by shape; however, accurate object recognition is often difficult due to imaging conditions that change due to external and internal factors. External factors include illumination conditions (for example, back-lit versus front-lit or overcast versus direct sunlight) and camera poses (for example, frontal view versus side view). In the field of pattern recognition, variations imaged objects exhibit due to varying imaging conditions are typically referred to as intra-class variations.

The ability to recognize objects across intra-class variations determines success in practical applications. A feature common to object recognition is a similarity measure—where objects are considered similar if they belong to the same class. The similarity measure can be used to verify that two object images belong to the same class or to classify images by determining to which of the given objects the new example is most similar; however, designing a good similarity measure is difficult.

Simple similarity measures such as those based on the Euclidean distance used directly in the image space do not typically work well because the image can be affected more by the intra-class variations than by inter-class variations. Therefore, object recognition should be able to extract the image features that maximize the inter-class differences relative to the intra-class differences.

More recently, object recognition has been driven to a great extent by the advances in texture-based descriptors, such as scale-invariant feature transform (SIFT) (see D. Lowe, "Distinctive Image Features from Scale-Invariant Keypoints", 2 International Journal of Computer Vision 60 (2004)) and histograms of oriented gradients (HoG) (see N. Dalai and B. Triggs, "Histograms of Oriented Gradients for Human Detection", 1 IEEE Computer Society Conference on Computer Vision and Pattern Recognition (CVPR), 886-893 (2005)). These descriptors capture local or semi-local object information, focus on high-frequency edge information, and can be discriminative.

Although SIFT and HoG have had some success on recognition tasks over a variety of object types (see L. Fei-Fei, R. Fergus, and P. Perona, "Learning Generative Visual Models from Few Training Examples: An Incremental Bayesian Approach Tested on 101 Object Categories", 106 Comput. Vis. Image Underst. 1 (2007); M. Everingham et al., "The 2005 Pascal Visual Object Classes Challenge", In Selected Proceedings of the First PASCAL Challenges Workshop, 3944 Lecture Notes in Artificial Intelligence 117 (2005)), SIFT and HoG tend to perform poorly on weakly-textured object or objects with variable appearance. For example, this is true for many man-made objects such as furniture, bottles, cups, apparel, etc.

Shopping for apparel is an important business on the Internet; however, visual searching for similarity or style is still a largely unexplored topic. In many clothing items, shape is a defining feature. Many of the techniques focus on describing contours or sets of contours. A common approach is to search for a set of connected contours, which explains most of the object boundary in an image. Examples include contour networks (see V. Ferrari, T. Tuytelaars, and L. V. Gool, "Object Detection by Contour Segment Networks", Computer Vision—ECCV, 14-28 (2006)); shape trees (see P. Felzenszwalb and J. Schwartz, "Hierarchical Matching of Deformable Shapes", Computer Vision and Pattern Recognition (2007)); the particle-based search algorithm by Lu et al. (C. Lu, L. J. Latecki, N. Adluru, X. Yang, and H. Ling, "Shape Guided Contour Grouping with Particle Filters", Proc. IEEE ICCV (2009)); and simultaneous object detection and segmentation by Toshev et al. (A. Toshev, B. Taskar, and K. Daniilidis, "Shape-Based Object Detection via Boundary Structure Segmentation", International Journal of Computer Vision (IJCV) (2010)).

Such approaches capture whole contours instead of sparse point configuration. In addition, such approaches target at segmenting the object, which requires an inference—which can be costly as such approaches are not tractable. Further, small boundary fragments have been used as weak classifiers with boosting and subsequent voting. See A. Opelt, A. Pinz, and A. Zisserman, "A Boundary-Fragment Model for Object Detection", European Conference on Computer Vision (2006); J. Shotton, A. Blake, and R. Chipolla, "Contour-Based Learning for Object Detection", International Conference on Computer Vision (2005). Boosting refers to learning meta-algorithms for performing supervised learning. Supervised learning refers to machine learning task of inferring a function from supervised (labeled) training data.

Thus, it is a common user experience for a search for given object to draw into the search results a multitude of unrelated objects. For example, a search for the shoe object class "boots" may uncover multiple search results that do not relate to the apparel boots. Accordingly, users waste valuable time sifting through this unrelated content.

SUMMARY

Described herein are techniques for a shape descriptor used for object recognition. Tokens of an object in digital image data are captured, where tokens can be edges, interest points or even parts. Geometric configuration of the tokens are captured by describing portions of the shape of the object. The shape of such configurations is finely quantized and each configuration from the image is assigned to a quantization bin. Objects are recognized by utilizing a number of quantization bins as features.

This Summary introduces concepts in a simplified form that are further described below in the Detailed Description. This Summary is not intended to identify key features or essential features of the claimed subject matter, nor is it intended to be used as an aid in determining the scope of the claimed subject matter. The term 'techniques', for instance, refers to device(s), system(s), method(s) and/or computer-readable instructions as permitted by the context above and throughout the document.

BRIEF DESCRIPTION OF THE FIGURES

The detailed description refers to the following accompanying

DRAWINGS

DETAILED DESCRIPTION

Overview

Described herein are techniques for a shape descriptor used for object recognition. A new representation, non-limitingly referred to as a shape graph, captures the geometric configuration of tokens, where tokens can be edges, contours, interest points or even parts. Tokens can be both external and internal. Complex relations between object parts are captured. Such relations intend to describe a portion of the object shape by capturing short-range as well as long-range geometric relationships between tokens.

The shape graphs describe the geometric relationships among several tokens extracted from the image. The shape graphs in the image get detected only if the tokens and their geometric relationships are present. Thus, a shape graph can be considered as a conjunction of multiple geometric conditions involving several tokens. In this way, the shape graph captures complex geometric interactions across various tokens. Such representation is not anchored at a particular location, and thus such representation is translation invariant.

Objects are modeled by combining a large number of relations between tokens. Machine learning systems are applied to build object classifiers. These techniques for a shape descriptor used for object recognition lead to a performance boost compared to simpler configurations of the prior art. In addition, for a medium-scale recognition task the techniques for a shape descriptor used for object recognition described herein perform better than the SIFT and HoG descriptors.

Although a given shape graph may contain several tokens and thus capture more complex shape structures, a shape graph can be sometimes somewhat ambiguous due to the weak discriminative power of the individual tokens. To address this issue, a large number of different shape graphs model an object class. Similar shape graphs are quantized into a range of values, which is referred to as a bin. Quantization is a compression technique that compresses a range of values to a single quantum value. The quantization bins are used to model the object class. The quantization of the space of multiple possible shape graphs provides for an efficient comparison between shape graphs. The combination of a large number of shape graphs within discriminative classification frameworks is non-limitingly referred to as an object-shape model.

This brief overview, as well as section titles and corresponding summaries, are provided for the reader's convenience and are not intended to limit the scope of the claims nor the proceeding sections.

System Architecture

Figure 1:
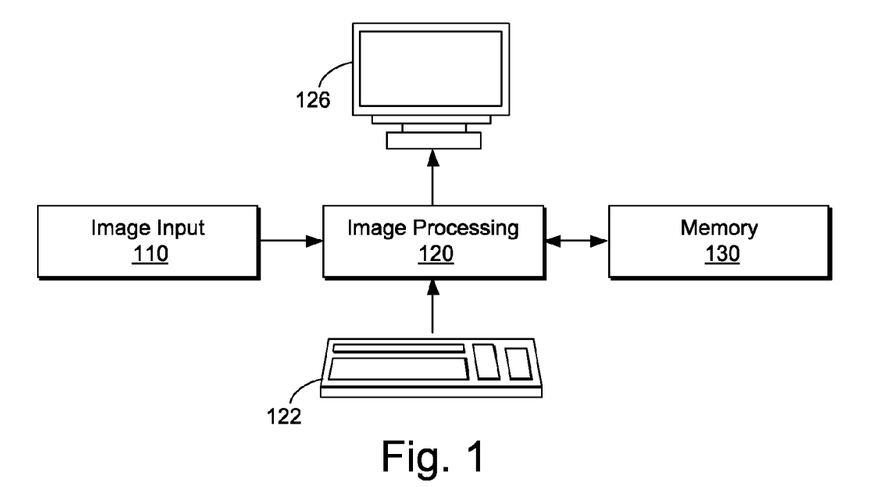
FIG. 1 is a block diagram of an example system for performing techniques for a shape descriptor used for object recognition.

FIG. 1 shows a high-level block diagram of an example system for techniques for a shape descriptor used for object recognition. The system 100 includes an image input module 110, an image processing module 120, and memory 130. The image input module 110 provides digital image data. The image input module 110 may be one or more of any number of modules for providing digital image data, such as a network connection, a recording medium, and/or any digital-image acquisition device. The image processing unit 120 may include an input device such as, for example, a keyboard 122 and a display 126.

The image processing module 120 receives digital image data from the image input module 110 and performs object recognition in a manner detailed below. Various intermediate and final output generated by the image processing module 120 may be presented on the display 126. In addition to performing object recognition, the image processing module 120 may perform additional functions such as color/density correction, compression, and/or other image processing functions.

Figure 2:
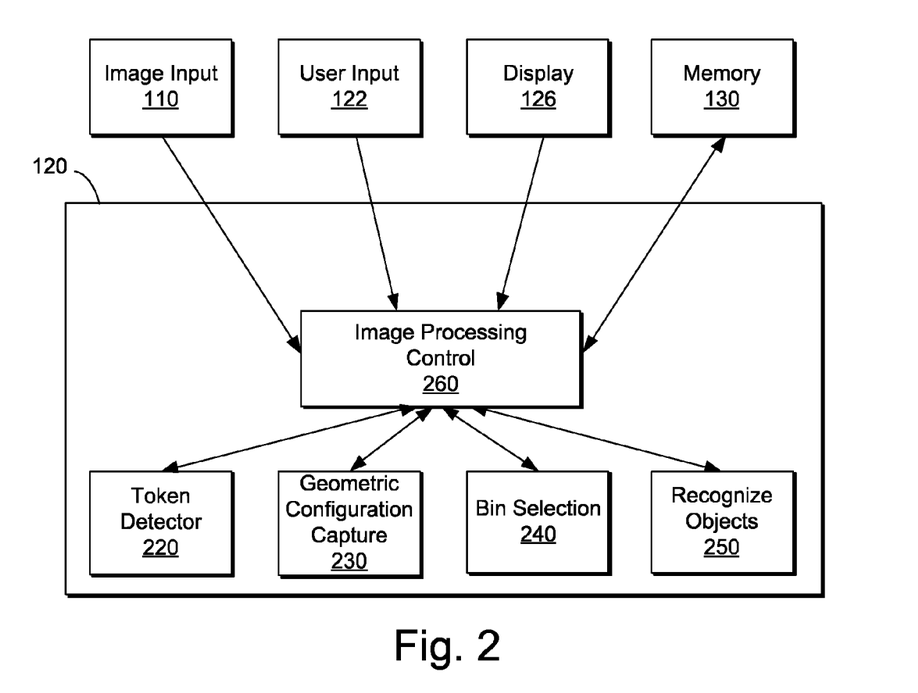
FIG. 2 is a block diagram illustrating an example of an image processing module.

FIG. 2 is a block diagram illustrating an example of the image processing module 120. The image processing module 120 includes a token detector module 220; a geometric-configuration capture module 230; a bin selection module 240; and recognize objects module 250. These modules 120 perform object recognition in a manner detailed below.

Figure 3:
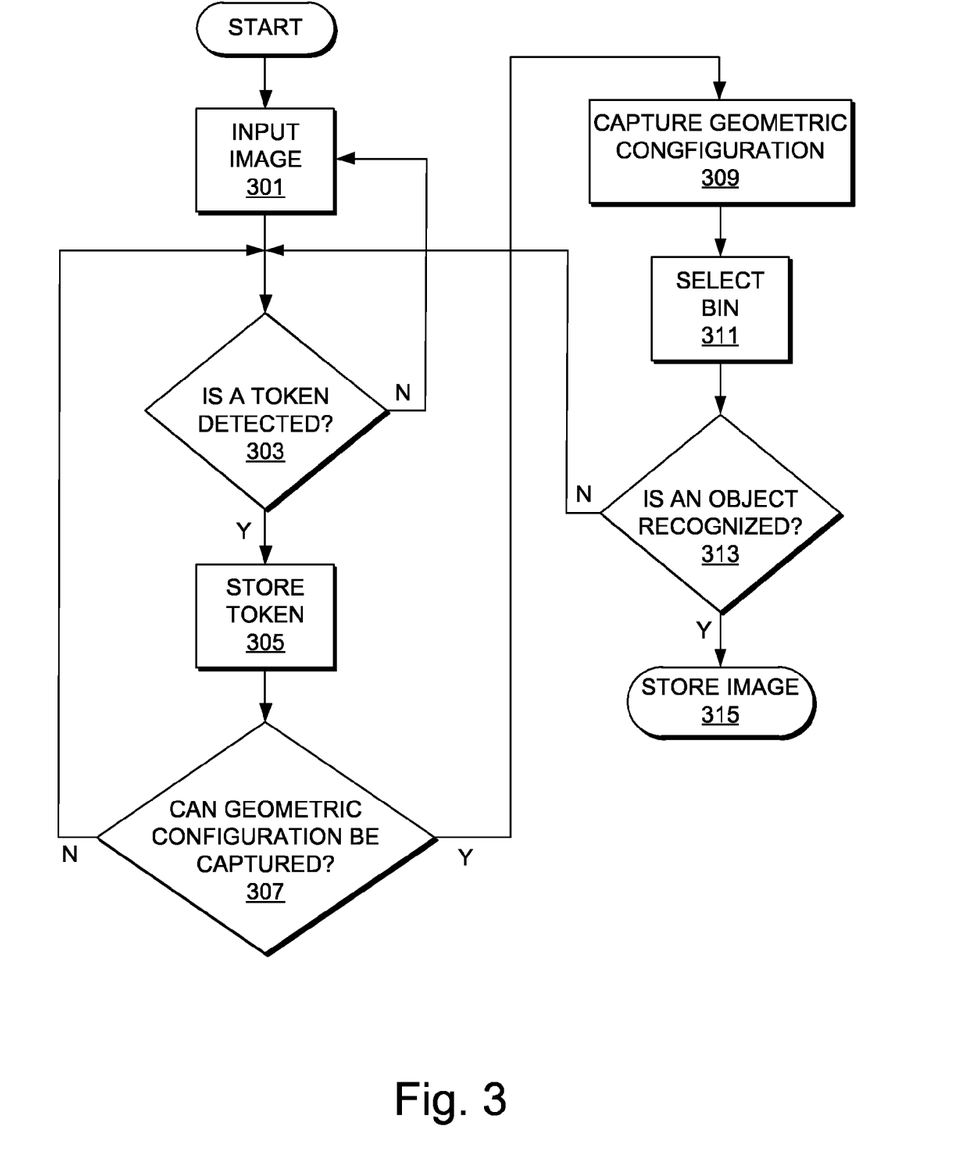
FIG. 3 is a flow-chart illustrating an example of an image processing process.

FIG. 3 is a flow-chart illustrating an example of an image processing process according to one implementation. Other implementations perform the steps of FIG. 3 in different orders. In addition, other implementations include different and/or additional steps than the steps described herein. In one implementation, the steps of FIG. 3 are performed by one more executable programs that are part of the image processing module 120.

Initially, the image input module 110 inputs an image 301 into the image processing module 120. The image is input in the format of digital image data. The token detector module 220 determines if a token can be detected 303. Tokens of an object are detected in the digital image data. The token detector module 220 detects tokens from the group consisting of edges, contours, interest points, parts, and combinations thereof. If a token can be detected, the token is stored 305; if a token cannot be detected, the process returns to the image input module 110.

The geometric-configuration capture module 230 determines if a geometric configuration can be captured 307. The geometric configuration of the tokens can be captured if a plurality of portions of the shape of the object can be described. If a geometric configuration can be captured, the geometric configuration is captured 309; if a geometric configuration cannot be captured, the process returns to token detector module 220.

The geometric configuration of the tokens are assigned to a quantization bin. The bin selection module 240 selects a quantization bin 311. The geometric configuration of the tokens are quantized. The object is recognized by utilizing the bins as individual measurable heuristic properties of the object. The features are utilized to build object classifiers with a machine learning system. The recognize objects module 250 determines if an object can be detected 313. The object is recognized by utilizing a plurality of quantization bins as features. If an object can be detected, the image is stored 315 in memory; if an object cannot be detected, the process returns to token detector module 220.

A Shape Descriptor Used for Object Recognition

In more detail, techniques for a shape descriptor used for object recognition are described. Shape graphs capture the geometric configuration of tokens. A large number of shape graphs can be combined into an object-shape model.

Figure 4:
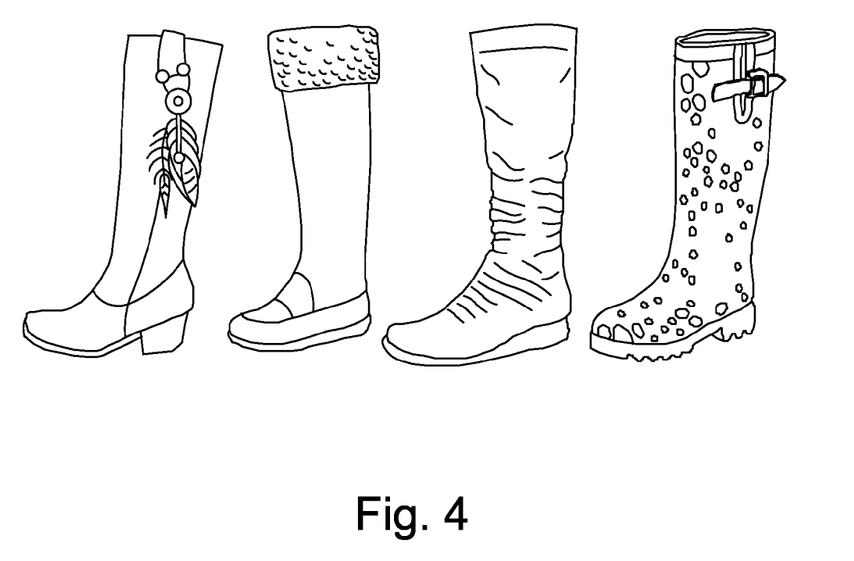
FIG. 4 displays an example man-made object.
Figure 5:
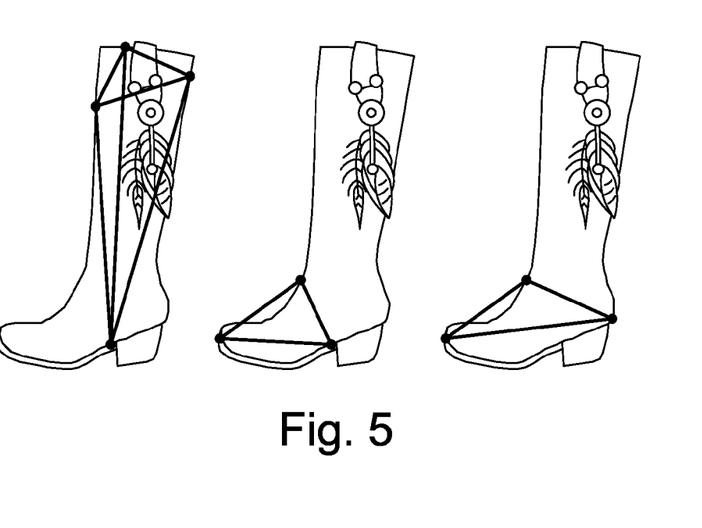
FIG. 5 displays a shape graph of an image taken from the man-made object of FIG. 4.

In an example detailed herein, object recognition is applied to a dataset of shoe contour edges, which is shape dominant, challenging, and large compared to other publicly-available datasets for shape-based recognition. Contour refers to boundaries on an object while edges refer to points on the contour. Referring to FIG. 4, an example man-made object consisting of the shoe object class "boots" is seen. The techniques for a shape descriptor used for object recognition described herein address the question: what visual properties are common among the given example class of boots? FIG. 5 depicts examples of shape graphs of varying sizes for the left most boot in FIG. 4. The objects are considered boots—not because of their color, appearance or textile—but mainly because of their shape, which can be defined as the outline of their boundaries. Of course, the use of a shoe dataset and contour edges are for purpose of illustration only, and is not limiting to the present description.

The shape graph captures a geometric configuration of shape tokens and thus improves upon part-based models. Examples of object models based on graphs targeting shape include Berg et al.'s work using geometric blur as graph nodes. See A. C. Berg, T. L. Berg, and J. Malik, "Shape Matching and Object Recognition Using Low Distortion Correspondence", Computer Vision and Pattern Recognition (2005). Leordeanu et al. use a graph having edges with an over-complete parameterization of their pairwise relationships. See M. Leordeanu, M. Hebert, and R. Sukthankar, "Beyond Local Appearance: Category Recognition from Pairwise Interactions of Simple Features," Computer Vision and Pattern Recognition (2007). These approaches, however, use a single graph to model an object and graph matching for inference, which is non-deterministic polynomial-time (NP) hard.

On the other side, a large number of graphs are quantized, which allows for complex modeling while alleviating the need for hard inference. Amit et al. use large numbers of tag configurations aimed at shape description within a randomized forest framework for digit recognition. See Y. Amit, D. Geman, and K. Wilder, "Joint Induction of Shape Features and Tree Classifiers", 19 IEEE PAM 11 (1997). Further, Danielsson et al. use point configurations to define decision stumps. See O. Danielsson and S. Carlsson, "Generic Object Class Detection Using Boosted Configurations of Oriented Edges", Asian Conference on Computer Vision (2010). However, the decision stumps have different parameterization and are applied within an Adaptive Boosting (AdaBoost) framework. This captures the geometric relations of single edges to the object center in an additive way. Thus, this does not capture complex interactions and is weaker in its expressivity.

Utilizing a large number of quantized shape graphs captures statistical properties of point sets. In this respect, shape graphs improve upon part-based model geometric hashing. See Y. Lamdan, J. Schwartz, and H. Wolfson, "Affine Invariant Model-Based Object Recognition", 6 IEEE Trans. on Robotics and Automation 5 (1990). Part-based models geometric hashing deals with geometric properties, as well as the topological properties used by Carlsson. See S. Carlsson, "Order Structure, Correspondence and Shape Based Categories", International Workshop on Shape, Contour and Grouping (1999).

Similarly, Toshev et al. capture relationships between points in a statistical manner, which are however only pairwise. See A. Toshev, B. Taskar, and K. Daniilidis, "Shape-Based Object Detection via Boundary Structure Segmentation", Computer Vision and Pattern Recognition (2010). Ferrari et al. used a quantization of contour groups in conjunction with a support vector machine. See V. Ferrari, L. Fevrier, F. Jurie, and C. Schmid, "Groups of Adjacent Contour Segments for Object Detection", IEEE Trans. on Pattern Analysis and Machine Intelligence (2008).

Shape Graph Parameterization

To describe the shape graph, a parameterization of the tokens and the relationships of the tokens are obtained. Parameterization is the process of deciding and defining the parameters necessary for a complete or relevant specification of an object. Consider a set of n edges $V=\{v_1, v_2, \ldots, v_n\}$ lying on an exterior of an object as well as on interior contours. Since the edges contain very little information, the geometric relationships among the edges contain most of the information about the object shape. Hence, consider the directed graph $G=(V, E)$ of size n, where a subset E of possible relationships among boundary edges is captured. The pairs of boundary edges contained in subset E are directed, since the parameterization of each pair may depend on the order of the edges.

Figure 6:
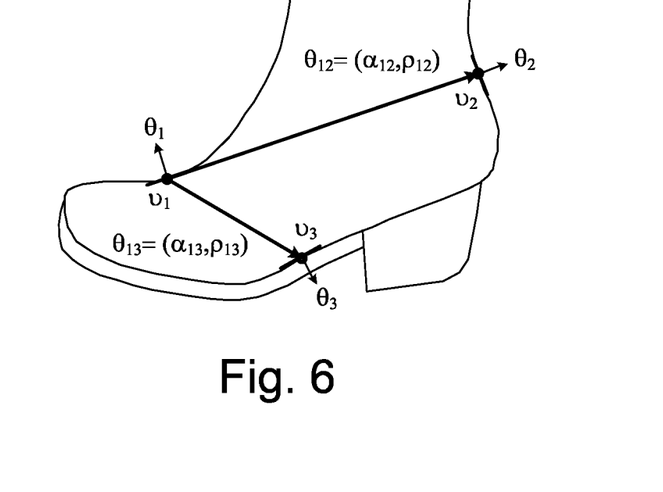
FIG. 6 displays a parameterization of the shape graph of FIG. 5.

To parameterize the shape graphs, features for both the tokens as well as pairs of tokens are defined. Referring to the example set forth in FIG. 6, for a shape graph of size 3 with two edge pairs $E=\{(v_1, v_2), (v_1, v_3)\}$, the parameterization of the graph is visualized. Each edge $v_l$ is described by its angular orientation $\theta_l$. A pair of edges $(k, j) \in E$ has parameterization $\theta_{kj}+(\alpha_{kj}, \rho_{kj})$ consisting of the polar coordinates of the vector $v_k v_j$ connecting one edge with the other edge in the pair, where $\alpha_{kj}$ is the angular orientation of the vector and $\rho_{kj}$ is the length of the vector.

Further, an ordering of the edges is fixed in V. An ordering in E is defined by lexicographically ordering $v_k v_j$. To define a description $\Theta_G$ of the shape graph G, the features of the edges are concatenate as well as the above pairs using the ordering of V:

$$\Theta_G = (\theta_1, \ldots \theta_n, \theta_{h\psi_1}, \ldots, \theta_{h\psi_l}) \quad (1)$$

The shape graph captures the geometric configuration of the tokens given their ordering. The angles are defined with respect to a global coordinate system and, as a result, the features are not rotation invariant. Due to the use of vector length, the parameterization is not scale invariant; however, the parameterization is translation invariant since location information is captured in a relative way.

While this is an example of one parameterization, other possible parameterization methods are considered within the scope herein.

Shape Graphs as Features

Shape graphs represent a sparse portion of the object shape. This technique is not limited to local information and can capture relationships among arbitrary shape tokens. Since the model captures only a portion of the shape, the model is robust against occlusions.

One way to utilize the shape graphs in conjunction with the parameterization is to use shape graphs as part-based models; however, tokens are much less discriminative than the widely used texture-based parts such as HoG or SIFT. This can result in a diminished descriptive power of the individual shape graphs.

To address this issue, a large number of the shape graphs are utilized and treated as features. Features are individual measurable heuristic properties of the object being observed. Features are defined as a shape graph of a particular type. To achieve this, consider a quantization of the feature space of the parameterization from Equation 1. Such quantization can be thought of as an enumeration of different types of shape configurations. The quantization can be defined, for example, in terms of a quantization of the individual features in Equation 1. These features are angles or vector lengths or both.

To combine a large number of shape graphs in an object-shape model, quantization bins are provided. The quantization bins are treated as features, and a subset of quantization bins are utilized as the object-shape model. In one implementation, a randomly sampled subset of quantization bins is utilized as features within a support vector machine classifier. In another implementation, shape graphs are utilized as split functions within a randomized decision forest classifier. A dataset of objects with dominant shape information and weak appearance and texture are introduced. Thus, a richer and larger test bed for shape-based recognition occurs.

For the edge-normal orientation, $n_n$ uniform bins are utilized in the range (0; Π); for the edge-pair orientation, $n_o$ bins are utilized. The vector lengths are binned in $n_l$ bins using, for example, a log-polar binning that improves upon S. Belongie, J. Malik, and J. Puzicha, "Shape Matching and Object Recognition Using Shape Contexts", 24 IEEE Trans. PAMI 4 (2002). A data-driven quantization is possible; however, due to the geometric meaning of the individual features, quantization is defined consistent with the perception of allowable shape deformation.

Figure 7:
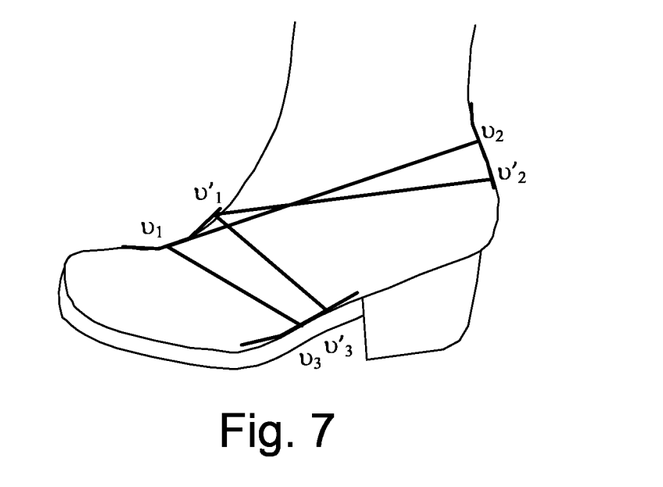
FIG. 7 displays an example of a bin for the shape graph of FIG. 5.

An example of a bin is seen in FIG. 7. In this example, visualization of one of the bins in the quantization space is for shape graphs of size 3. The points which lie on the boundary lines form a shape graph belonging to the same bin. For example, shape graphs $\{v_1, v_2, v_3\}$ and $\{v'_1, v'_2, v'_3\}$ quantize in the same way. Graphs belonging to the same bin represent roughly the same shape.

In a particular image, provided that contours have been detected, $$c_b^n = |\{G | G \text{ has size } n \, \Theta_G \text{ is in bin } b\}| \quad (2)$$

estimates a count of the shape graph of size k. The above count can be regarded as a feature associated with this shape graph. This quantization scheme results in $$n_n^n n_o^{(n-1)} n_l^{(n-1)}$$

bins for a graph of size n.

As the shape-graph size grows, the complexity of computing bins grows exponentially. Denote by P the contour-points set extracted from an image and m=|P|. Then, the complexity of computing shape graphs of size n is $O(m^n)$. To address this issue, a set of edge pairs E are used, which allows an efficient computation of bins counts.

In more detail, E={(1, 2), . . . , (1, n)}. Thus, parameterization resembles a star model, where the first point in the ordering can be a reference point. In this implementation, the parameterization from Equation 1 can be summarized as $\Theta_G = (\theta_1, \theta_{1,2}, \theta_2, \ldots, \theta_{1,n}, \gamma_n)$, where with a slight abuse of notation the features have been re-ordered—the first feature is the normal at the reference points, while the subsequent features $(\theta_{1,k}, \theta_k)$ are grouped according to the second point in each edge pair.

Utilizing this shape-graph, the values of selected bins can be computed efficiently. To see this, consider for a moment the features $\theta_{1,k}$ related to one of the edge pairs in the shape graph. The features $\theta_{1,k}$ define a quantization of size $n_n$ $n_o$ $n_l$ that can be pre-computed for each contour point p∈P in the image. The bin count for bin b in this quantization is denoted by $c_b(p)$.

Further, the quantization space of the shape graph can be represented as a Cartesian product of the quantization spaces of the reference point feature and the features of edge pairs. That is, if b is a shape-graph bin, then b can be written as $b=(b_1, b_2, \ldots, b_n)$, where $b_1$ is the bin of the reference point alone and $b_k$, $k \in \{2, \ldots n\}$ are the bins of the edge pairs in their respective quantization spaces. Hence, the bin count for the shape graph can be computed as a product of the bin counts $b_{bk}$, (p) of the edge pairs, already pre-computed as detailed above:

$$c_b = \sum_{p \in P \text{ with normal in } \ln} c_{b_z}(p) \ldots c_{b_w}(p) \quad (3)$$

Soft assignment increases the robustness of the bin assignment, which is computed via linear interpolation. This is applied to $c_b(p)$ and propagated to the final bin count via Equation 3.

Computing the bin counts for edge pairs is in $O(m^2)$. Afterwards, computing the value of a single bin is linear in the point count and shape-graph size. Overall, the complexity of computing s bins is O(smn).

Object-Shape Model

As previously noted, an object-shape model is built by combining a large number of such shape graphs within discriminative classification frameworks. Two example classifier frameworks for object recognition are detailed below—support vector machine and randomized decision forest.

Support Vector Machine

One example implementation utilizes the shape graphs using a linear support vector machine (SVM). Consider shape graphs of size n and a particular binning scheme $(n_n, n_o, n_l)$. This will result in $$n_n^n n_o^{(n-1)} n_l^{(n-1)}$$

features, which even for a small n and binning schemes cannot be handled directly by the classifier. Therefore, only a subset of the bins is considered. At random, m bins are sampled. The resulting bin values are concatenated in an m-dimensional feature vector and, after normalization, used with an SVM classifier. The resulting model can be referred to as $SVM_{n,m}$.

Figure 8:
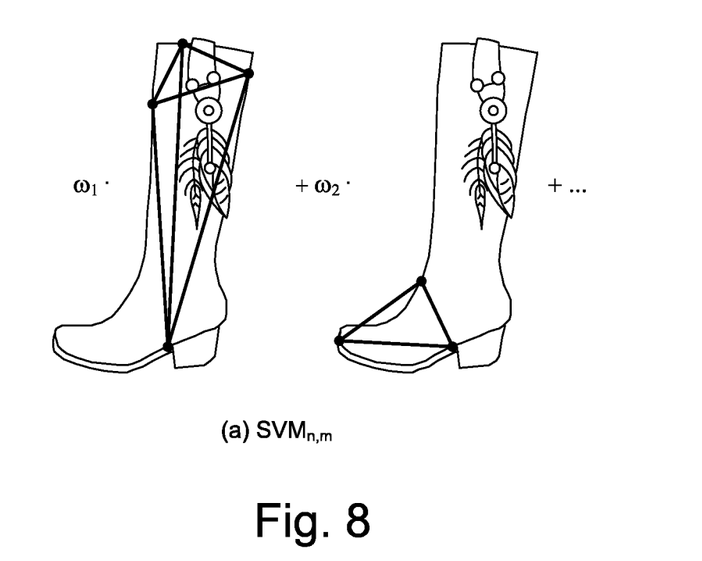
FIG. 8 displays a visualization of two object-shape models for the shape graph of FIG. 5 for a support vector machine.

The described implementation can be thought of as an additive combination of a large number of sparse shape configurations, as shown in FIG. 8. The presence of each configuration is quantified with the number of its repetitions. Clustering need not be used to obtain shape-graph types in a data driven way, but resort is made to a predefined quantization where each bin occupies roughly the same volume of the shape-graph feature space. This aims at preserving discriminative shape graphs, which might get lost in a data-driven clustering.

Randomized Decision Forest

Another implementation utilizes the shape graphs using a randomized decision forest (RDF). A RDF is a multi-class ensemble classifier consisting of decision trees as weak classifiers. See L. Breiman, "Random forests", 45(1) Machine Learning, 5-32 (2001). An input image is classified by applying each of the decision trees and aggregating the decisions of the individual trees.

Figure 9:
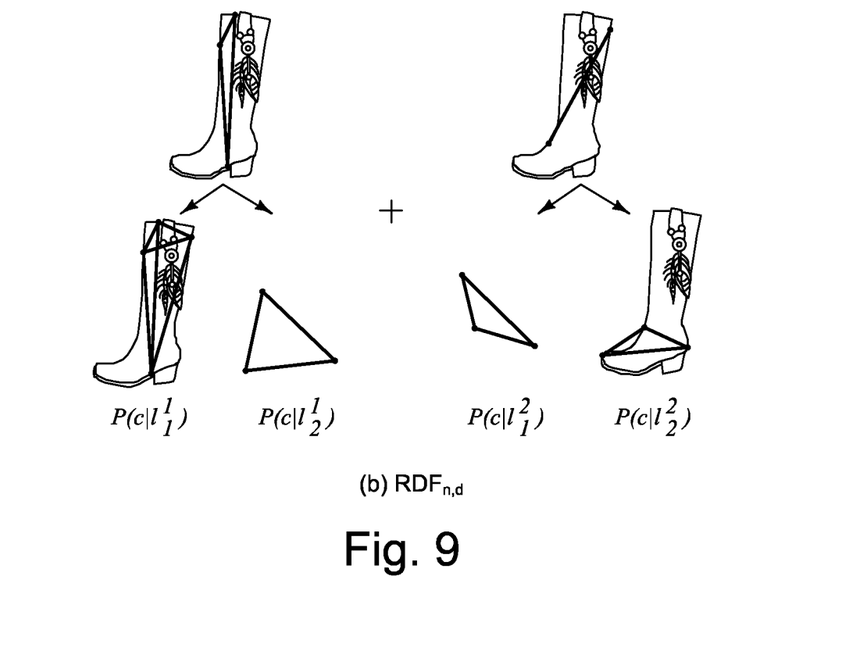
FIG. 9 displays a visualization of two object-shape models for the shape graph of FIG. 5 for a randomized decision forest.

In more detail, for the $i^{th}$ decision tree in the forest, the input image is propagated down the tree by applying the binary conditions at each tree node until a leaf node l is reached (see FIG. 9). The binary conditions are applied on shape features from image contours, as will be detailed below.

For each class c and leaf l in the decision tree, there is an associated probability $P_i(cl)$ for the input image to belong to class c.

Suppose that for a particular input image the leaves reached for the T trees in the forest are $L=\{l_1, \ldots, l_n\}$. Then, the probability $P_i(cL)$ of this image belonging to class c is averaged across the T trees is:

$$P_i(c|L) = \frac{1}{T} P_i(c|L_i) \quad (4)$$

The individual trees are based on shape graphs, as detailed above. Using Equation 2, a node-split condition can be defined, which is based on the count of shape graphs of a specific type which are seen in an image. Consider a bin b from the quantization of shape graphs of size n, a count threshold t, and a sign $s \in \{-1, 1\}$. Then, a binary split condition is defined as $$g^n(b,t,s) = [s \cdot c_b^n \leq s \cdot t] \quad (5)$$

where (•) returns the value of the predicate—either true or false.

During traversal of the tree with a particular input image, when at a particular node the condition corresponding to this node is checked and is true, then the image traverses the right sub-tree rooted at this node; elsewise, the image traverses the left sub-tree rooted at the node. Each decision tree has a maximum depth d set during training. The introduced model can be referred to as $RDF_{n,d}$.

The RDF is trained by training the $i^{th}$ decision tree independently on a subset $D_i$ of the training data D. Each subset $D_i$ is sampled independently with replacement from the training set D. In an experiment, the size of each subset $|D_i|$ was chosen as $|D_i|=0.5|D|$.

The construction of each tree starts with the shape graphs of size 2 from the images in the training set D and continues recursively. Suppose that at a particular node at depth k the subset $S \subset D_i$ is propagated. This subset was used to randomly generate a new binary condition $g^n$ (b, t, s) of the form from Equation 5, which splits S in two subsets $S_l$ and $S_r$, with the largest increase of class purity. The class purity is defined using information gain. Suppose that the empirical distributions of the object classes in S, $S_i$, and $S_r$ are p, $p_i$, and $p_r$ respectively. Then, the information gain is defined as:

$$I(g^n, S) = H(p) - \frac{|S_l|}{|S|} H(pr) - \frac{|S_r|}{|S|} H(pr) \quad (6)$$

where H(•) is the Shannon entropy. The entropy could be thought of as class purity of each set, and the above criterion aims at finding a split condition, which leads to the largest increase in this purity after the split.

The method below details how to grow at a single node of a decision tree in learning of randomized decision forest with shape graph. The input is a set of images S and an edge graph size k. The output is a binary condition g* of the form in Equation 5 and a split of S into two subsets $S_l$ and $S_r$:

$\mathcal{G} \emptyset$

For j=1→M do
Pick a bin b from the quantization of edge graphs of size k at random.
Pick a threshold t at random and $s \in \{-1, 1\}$ at random.

Define a binary condition $g^k(b,t,s)$ using Equation 5, $k \in \{2, \ldots, n\}$.

$\mathcal{G} \quad \mathcal{G} \cup \{g^k(b,t,s)\}$

End for
g* arg $\max_{a \in G} I(g)$
Use g* to split S into $S_i$ and Sr.

The following is a non-limiting example in accordance with one implementation of the described technology:

Example

To study shape-based recognition methods, a new dataset of shoes were collected consisting of 21 categories, with wide variety of inter- and intra-class variation. Shoes represent a good example as a consumer may search for a shoe object class and prior object classifiers would uncover multiple search results that do not relate to the shoe object class. Again, the use of a shoe dataset for purpose of illustration only, and is not limiting to the present description.

Figure 10:
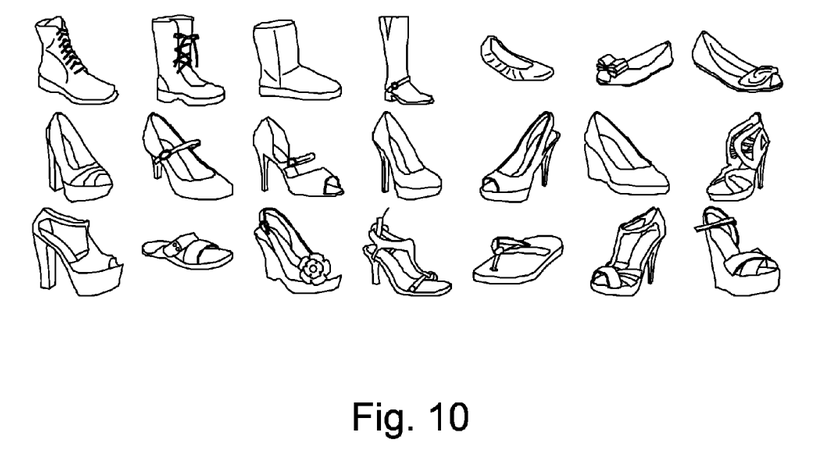
FIG. 10 displays different shoe categories of the Example object recognition using shape graphs.

The images were crawled from commercial sites and product search results. The categories and examples are shown in FIG. 10. The 21 different shoe categories include: first row: boots/lace-up, boots/shearling and fur trimmed, boots/short boots, boots/tall boots, flats/ballet, flats/dress, and flats/open-toe. Second row: pumps/basic, pumps/Mary-Janes, pumps/open-toe, pumps/platforms, pumps/slingbacks, pumps/wedges, sandals/strap, and ankle wrap. Third row: sandals/platforms, sandals/slides, sandals/sling-backs, sandals/special occasion, sandals/thongs and flip-flops, sandals/t-straps, sandals/wedges. The total count of the dataset was 21,000 images, with 1,000 examples per category.

In this dataset, shape is the dominant feature. In general, color and the texture pattern cannot be used to distinguish between the different shoe categories. This dataset is very challenging, especially due to the large variation of interior appearance of the shoes. The distinguishing feature can be very subtle, for example, determining whether a shoe is open-toe or not.

Though the images are not cluttered, there are a lot of inherent variability and ambiguity in the categories. Some of the categories are not mutually exclusive. For example, pump/platforms also could be pumps/open-toes as well, similarly for other categories. There also are variations in how the shoes are shown. For example, the shoe could be pointing right or left. There could be a single shoe or two shoes The shape-graph object model was applied to the shoe dataset. The shape graph was built upon the binarized responses of an edge detector similar to D. Martin, C. Fowlkes, and J. Malik, "Learning to Detect Natural Image Boundaries Using Local Brightness, Color, and Texture Cues", IEEE PAMI (2004). For each of the 21 categories, 500 were randomly picked images as the training set and another 500 as the testing set. Both SVM and RDF were trained as multi-class classifiers.

The SVM was trained using the package LIBSVM (C. Chang and C. Lin, "LIBSVM: A Library for Support Vector Machines", 2 ACM Transactions on Intelligent Systems and Technology (2011)) with regularization constant C=0.1. The RDF was trained as described above. For each test sample, the category with the highest score was assigned. The classification accuracy measured performance. A random classifier baseline was established as a classification accuracy of 4.8%.

Various parameterization of the shape graph and different edge-graph sizes were analyzed. The shape graph parameters are associated with the quantization scheme of the edge graph. The parameters are represented as a 3-tuple: ($n_o$, $n_n$, $n_l$). As detailed above, the larger the parameter value, the finer the binning.

Different parameterizations yield shape-graph features of different dimensions. The shape-graph dimension is given by:

$$n_D{}^n n_n{}^{n-1} n_l{}^{n-1},$$

Some examples are shown in Table 1:

TABLE 1

Shape graph quantization size for different binning schemes($n_o$, $n_n$, $n_l$) and graph sizes n.

| ($n_o$, $n_n$, $n_l$) | N = 3 | N = 4 | N = 5 |
| --- | --- | --- | --- |
| (4, 4, 8) | $6.6 \times 10^4$ | $8.4 \times 10^6$ | $1.1 \times 10^9$ |
| (3, 3, 4) | $3.8 \times 10^3$ | $1.4 \times 10^5$ | $5.0 \times 10^6$ |
| (2, 2, 4) | 512 | $8.2 \times 10^3$ | $1.3 \times 10^5$ |
| (2, 3, 3) | 648 | $1.2 \times 10^4$ | $2.1 \times 10^5$ |

When feature dimension gets larger, memory becomes a limiting factor in classifier training. For SVM classifiers, the shape-graph feature was randomly subsampled; for RDF, the feature space was dynamically explored at each tree node.

Thus, techniques for a shape descriptor used for object recognition that encapsulate the use of complex relations among shape parts are provided. These complex relations among shape parts can be used with discriminative classifiers, in this description the examples being SVM and RDF. The merits of the proposed shape graph representation were thoroughly examined with respect to the example shoe dataset. Empirically, more complex geometric configurations lead to a performance boost compared to simpler configurations of the prior art. In addition, for a medium-scale recognition task, as defined by the example shoe dataset, the present techniques perform better than the widely used Pyramid of HoG descriptors.

Concluding Notes

The implementation described herein is not inherently related to any particular hardware or other apparatus. The operations can be controlled through either hardware or through computer programs installed in computer storage and executed by the processors of servers.

When embodied as hardware, the hardware may be specially constructed for the required purposes or the hardware may include a general-purpose computer selectively activated or reconfigured by a computer program stored on a computer-readable medium. In addition, the implementation described herein is not limited to any particular programming language.

The techniques for a shape descriptor used for object recognition may be implemented using a single computer or a network of computers, including cloud-based computing. The computers can be server-class computers including one or more high-performance central processing units (CPUs), memory, network inter-object, peripheral inter-objects, and other well-known components.

The computers can run an operating system. Examples include the LINUX® computer-operating system or variants thereof and the like. LINUX® computer-operating system is an open-source operating system that is available under a general-public license administered by The Linux Foundation, 1796 18th Street, Suite C, San Francisco, Calif. 94107. Of course, other types of operating system and computers can be used, and it is expected that more powerful computers developed in the future can be configured in accordance with the teachings herein.

The term computer-readable media includes computer-storage media. Example include magnetic-storage devices such as hard disks, floppy disks, and magnetic tape; optical disks such as compact disks (CD) and digital-versatile disks (DVD); magnetic-storage devices such as digital tapes, floppy disks, and magneto-resistive-random-access memory (MRAM); non-volatile memory such as read-only memory (ROM), erasable-programmable-read-only memory (EPROMs), and electrically-erasable-programmable-read-only memory (EEPROMs); volatile memory such as random-access memory (RAM), dynamic random access memory (DRAM), ferroelectric-random-access memory (FeRAM), and static-random-access memory (SRAM); or any type of media suitable for storing electronic instructions.

Furthermore, at times arrangements of operations have been referred to as modules or by functional names, without loss of generality. The term 'module' refers to computational logic for providing the specified functionality. The division of functionality between components, the naming of modules, components, attributes, data structures or any other programming or structural aspect is merely exemplary, and not mandatory or significant. In addition, other implementations may lack modules and/or distribute the described functionality among modules in a different manner. Functions performed by a component may instead be performed by multiple components, and functions performed by multiple components may instead performed by a single component. In general, functions described in one implementation as performing on the server side can be performed on the client side in other implementations and vice versa, if appropriate.

Although the subject matter has been described with a specific implementation, other alternatives, modifications, and variations will be apparent to those skilled in the art. Accordingly, the disclosure is intended to be illustrative, but not limiting, and all such alternatives, modifications, and variations are within the spirit and scope of the following claims.

What is claimed is:

1. One or more computing devices configured to recognize objects in digital image data, the one or more computing devices comprising:
    an image input module configured to input images of objects;
    an image processing module configured to receive the input images from the image input module, the image processing module further configured to:
        detect tokens of an object in digital image data, wherein the tokens are detected from at least two selected from the group consisting of edges, contours, interest points, and parts of the object,
        capture a geometric configuration of the tokens by describing a plurality of portions of the shape of the object,
        quantize the geometric configuration of the tokens;
        assigning the geometric configuration of the tokens to a quantization bin, and
        recognize the object by utilizing a randomly selected subset of a plurality of quantization bins as features; and
    a memory in communication with the image processing module, the memory storing the recognized object.

2. The one or more computing devices of claim 1, wherein the image processing module is further configured to:
    capture the geometric configuration of the tokens with shape graphs.

3. The one or more computing devices of claim 1, wherein the image processing module is further configured to:

capture the geometric configuration of the tokens by parameterizing edges of the object.

4. The one or more computing devices of claim 1, wherein the image processing module is further configured to:
capture the geometric configuration of the tokens by ordering the tokens and concatenating the ordered tokens.

5. The one or more computing devices of claim 1, wherein the image processing module is further configured to:
utilize the features to build object classifiers with a machine learning system.

6. The one or more computing devices of claim 1, wherein the image processing module is further configured to:
capture geometric configuration of the tokens by describing short-range geometric relationships between tokens.

7. The one or more computing devices of claim 1, wherein the image processing module is further configured to:
capture the geometric configuration of the tokens by describing long-range geometric relationships between tokens.

8. The one or more computing devices of claim 1, wherein the image processing module is further configured to:
recognize the object by utilizing the bins as individual measurable heuristic properties of the object.

9. The one or more computing devices of claim 1, wherein the image input module inputs images of man-made objects.

10. A method implemented by one or more computing devices configured to recognize objects in digital image data, the method comprising:
detecting tokens of an object in digital image data, wherein the tokens are detected from at least two selected from the group consisting of edges, contours, interest points, and parts of the object;
capturing a geometric configuration of the tokens by describing a plurality of portions of the shape of the object;
quantizing the geometric configuration of the tokens;
assigning the geometric configuration of the tokens to a quantization bin;
recognizing the object by utilizing a randomly selected subset of a plurality of quantization bins as features; and
storing the recognized object in a memory.

11. The method of claim 10, further comprising:
capturing the geometric configuration of the tokens with shape graphs.

12. The method of claim 10, further comprising:
capturing the geometric configuration of the tokens by parameterizing edges of the object.

13. The method of claim 10, further comprising:
capturing the geometric configuration of the tokens by ordering the tokens and concatenating the ordered tokens.

14. The method of claim 10, further comprising:
utilizing the features to build object classifiers with a machine learning system.

15. The method of claim 14, further comprising:
building object classifiers with a support vector machine classifier.

16. The method of claim 14, further comprising:
building object classifiers with a randomized decision forest classifier.

17. The method of claim 10, further comprising:
capturing the geometric configuration of the tokens by describing short-range geometric relationships between tokens.

18. The method of claim 10, further comprising:
capturing the geometric configuration of the tokens by describing long-range geometric relationships between tokens.

19. The method of claim 10, further comprising:
utilizing the recognized object in a context selected from the group consisting of product searches in commerce, image searching, image archiving, image retrieval, image organization, manufacturing, security, mobile searching for objects in a search engine, and combinations thereof.

20. One or more non-transitory computer-readable media storing processor-executable instructions that, when executed, cause one or more processors to perform operations that recognize objects in digital image data, the operations comprising:
detecting tokens of an object in digital image data, wherein the tokens are detected from at least two selected from the group consisting of edges, contours, interest points, and parts of the object;
capturing geometric configuration of the tokens by describing a plurality of portions of the shape of the object;
quantizing the geometric configuration of the token;
assigning the geometric configuration of the tokens to a quantization bin; and
recognizing the object by utilizing a randomly selected subset of a plurality of quantization bins as features.

21. The one or more non-transitory computer-readable media storing processor-executable instructions of claim 20, further comprising:
capturing the geometric configuration of the tokens with shape graphs.

22. The one or more non-transitory computer-readable media storing processor-executable instructions of claim 20, further comprising:
capturing the geometric configuration of the tokens by parameterizing edges of the object.

23. The one or more non-transitory computer-readable media storing processor-executable instructions of claim 20, further comprising:
capturing the geometric configuration of the tokens by ordering the tokens and concatenating the ordered tokens.

24. The one or more non-transitory computer-readable media storing processor-executable instructions of claim 20, further comprising:
utilizing the features to build object classifiers with a machine learning system.

25. The one or more non-transitory computer-readable media storing processor-executable instructions of claim 20, further comprising:
capturing geometric configuration of the tokens by describing short-range geometric relationships between tokens.

26. The one or more non-transitory computer-readable media storing processor-executable instructions of claim 20, further comprising:
capturing the geometric configuration of the tokens by describing long-range geometric relationships between tokens.

* * * * *